United States Patent
Lupher

(10) Patent No.: US 10,605,569 B2
(45) Date of Patent: Mar. 31, 2020

(54) LASER RANGEFINDER BASED AUTOMATIC TARGET DETECTION

(71) Applicant: TrackingPoint, Inc., Pflugerville, TX (US)

(72) Inventor: John Hancock Lupher, Austin, TX (US)

(73) Assignee: Talon Precision Optics LLC, Jacksonville, FL (US)

( * ) Notice: Subject to any disclaimer, the term of this patent is extended or adjusted under 35 U.S.C. 154(b) by 274 days.

(21) Appl. No.: 15/610,548

(22) Filed: May 31, 2017

(65) Prior Publication Data

US 2018/0347949 A1 Dec. 6, 2018

(51) Int. Cl.
*F41G 3/06* (2006.01)
*F41G 1/35* (2006.01)
*G01S 17/08* (2006.01)
*F41G 3/08* (2006.01)
*F41G 1/473* (2006.01)
*G01S 17/10* (2020.01)
*F41G 3/16* (2006.01)
*G01S 7/487* (2006.01)

(52) U.S. Cl.
CPC ............ *F41G 3/065* (2013.01); *F41G 1/35* (2013.01); *F41G 1/473* (2013.01); *F41G 3/08* (2013.01); *F41G 3/165* (2013.01); *G01S 7/487* (2013.01); *G01S 17/08* (2013.01); *G01S 17/10* (2013.01)

(58) Field of Classification Search
None
See application file for complete search history.

(56) References Cited

U.S. PATENT DOCUMENTS

2013/0329211 A1* 12/2013 McHale ............... G01C 15/002
356/4.01

* cited by examiner

*Primary Examiner* — Reginald S Tillman, Jr.
(74) *Attorney, Agent, or Firm* — RM Reed Law PLLC

(57) ABSTRACT

In some embodiments, a device may include a laser rangefinder circuit including an emitter configured to direct a focused beam toward a view area and including one or more optical sensors configured to receive light including ambient light and reflections associated with the view area. The device may further include a processor coupled to the laser rangefinder and configured to determine an edge of an object within the view area based on measurements of the reflections.

19 Claims, 7 Drawing Sheets

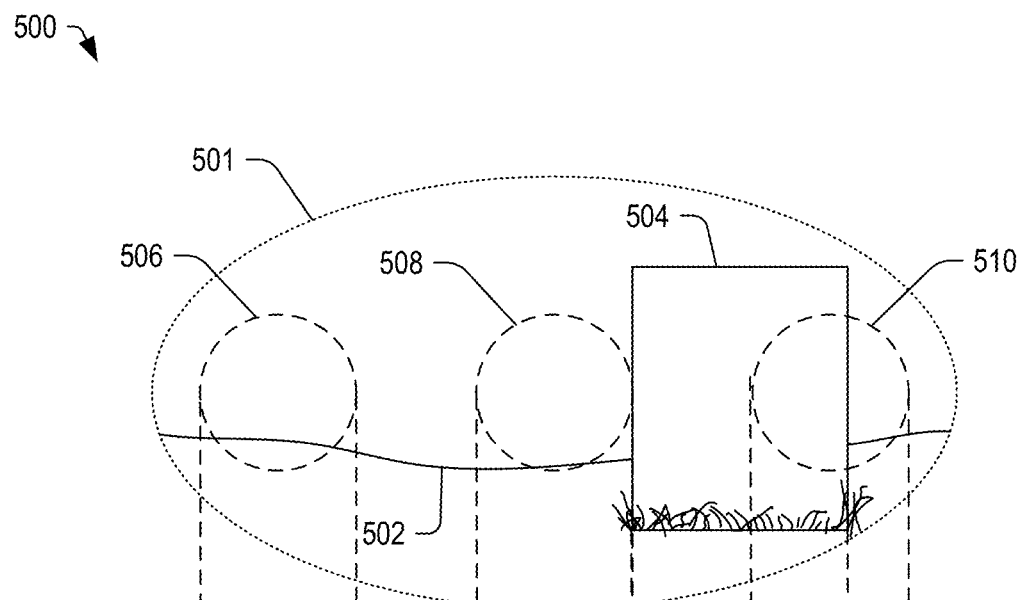
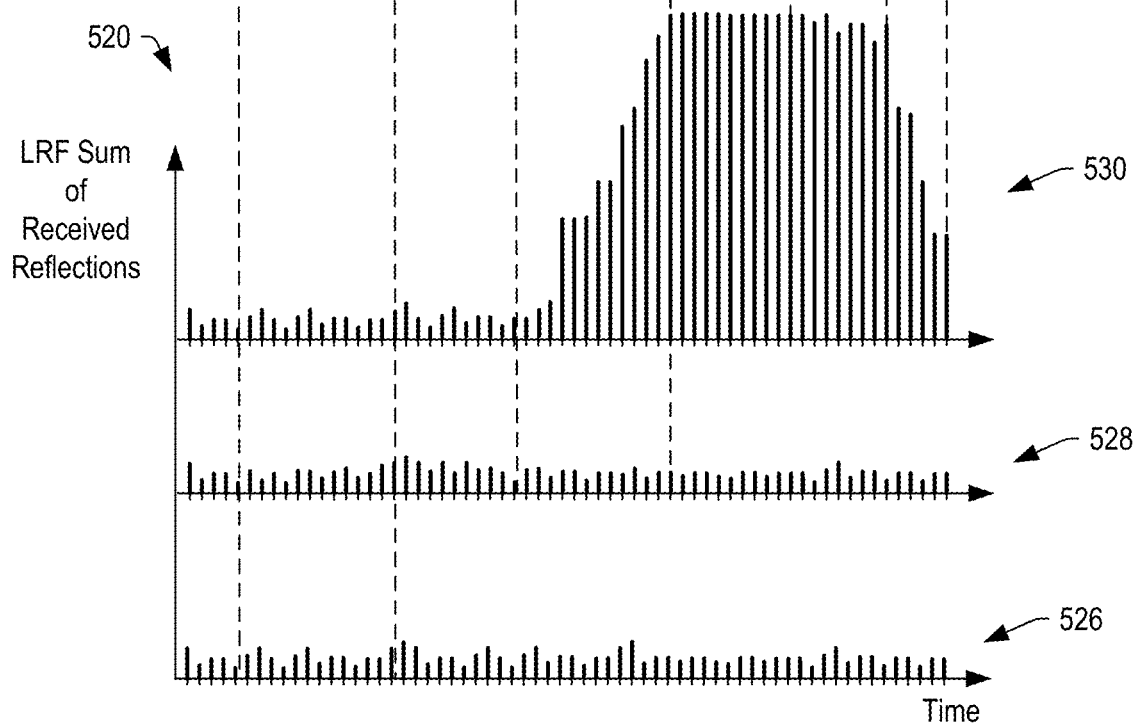
FIG. 5A
FIG. 5B

LASER RANGEFINDER BASED AUTOMATIC TARGET DETECTION

FIELD

The present disclosure is generally related to laser rangefinder systems, and more particularly to systems, devices, and methods of automatically detecting a target based on laser rangefinder data.

BACKGROUND

Laser rangefinder devices emit a focused beam toward a view area and detect light from the view area. A time difference between the emission of the focused beam and the reception of the reflected light can be used to determine a range between the laser rangefinder device and an object within the view area.

In some instances, ambient light may be received by the optical sensor circuitry of the laser rangefinder circuit and may represent noise. Further, the emitted beam may diverge along a range or distance between the laser rangefinder device and the irradiated view area, such that the beam may partially overlap an object within the view area. Accordingly, the received optical data may include data corresponding to one or more objects within the view area.

SUMMARY

In some embodiments, a device may include a laser rangefinder configured to emit a focused beam toward a view area and to receive reflections corresponding to an object within the view area. The device may include a processor configured to detect at least one edge of the object based on measurements of light intensity of the reflections over time.

In other embodiments, a device may include a laser rangefinder configured to emit a focused beam toward a view area and to receive reflections corresponding to an object within the view area. The device may further include a processor configured to determine at least one edge of the object based on a ratiometric scaling of the reflections over time.

In still other embodiments, a device may include a laser rangefinder configured to determine range data corresponding to an object within a view area. The device may further include a processor configured to determine an edge of the object based on measurements of light intensity of reflections of a focused beam over time.

BRIEF DESCRIPTION OF THE DRAWINGS

FIG. 5A depicts an illustrative example of a portion of a view area corresponding to a divergent beam of a laser rangefinder and including circular areas corresponding to an array of focused optical receivers configured to receive reflected light, in accordance with certain embodiments of the present disclosure.

FIG. 5B depicts a graph of laser rangefinder samples over time for each optical receiver of the array of FIG. 5A.

In the following discussion, the same reference numbers are used in the various embodiments to indicate the same or similar elements.

DETAILED DESCRIPTION OF ILLUSTRATIVE EMBODIMENTS

Embodiments of systems, devices, and method are described below that utilize measurements of intensity of reflections received by a laser rangefinder to detect a target within a view area. As the laser rangefinder sweeps across a view area, measurements of the intensity of the reflections received by the laser rangefinder may increase as the laser rangefinder sweeps onto an object and may decrease as the laser rangefinder sweeps off of the object. The changing measurements of the intensity be used to detect edges of a target based on the range data. In some embodiments, the device may be configured to automatically select the target based determination of the edges. In some embodiments, the device may include an optical scope, which may apply a visual marker to the selected target within a display of the scope. The visual marker may be positioned on the object within the view provided to the display, and a processor of the device may track the selected target within the view area while maintaining the visual marker on the target. In certain embodiments, the device may also be configured to control timing of the discharge of a firearm, after the trigger shoe is pulled, to enable discharge when the firearm is aligned to the selected target.

It should be understood that beam divergence of the focused beam provided by the laser rangefinder creates a laser spot of a certain size, which size expands as the range increases. In a particular embodiment, the spot may be approximately 10 inches in diameter at a range of one hundred yards. The size of the spot created by the divergence of the laser beam makes it difficult to determine edges of a target with precision. In some examples, the firearm may be aligned to a target when the received reflections correspond to an overlap of approximately fifty percent of the beam with the target. An optical sensor within a device (such as a firearm scope) may be configured to receive reflected light and to generate an electrical signal proportional to the received reflections and to provide the electrical signal to a processor of the device. In some examples, the amplitude of a sum of samples may increase as the aim point moves into alignment with an object and may decrease as the aim point moves away from alignment with the object. In some embodiments, the processor may be configured to determine one or more edges of an object based on measurements of light intensity of reflections over time. In some embodiments, the edges may be determined by a ratiometric scaling of the measured intensity of the reflections over time. Other embodiments are also possible.

Figure 1:
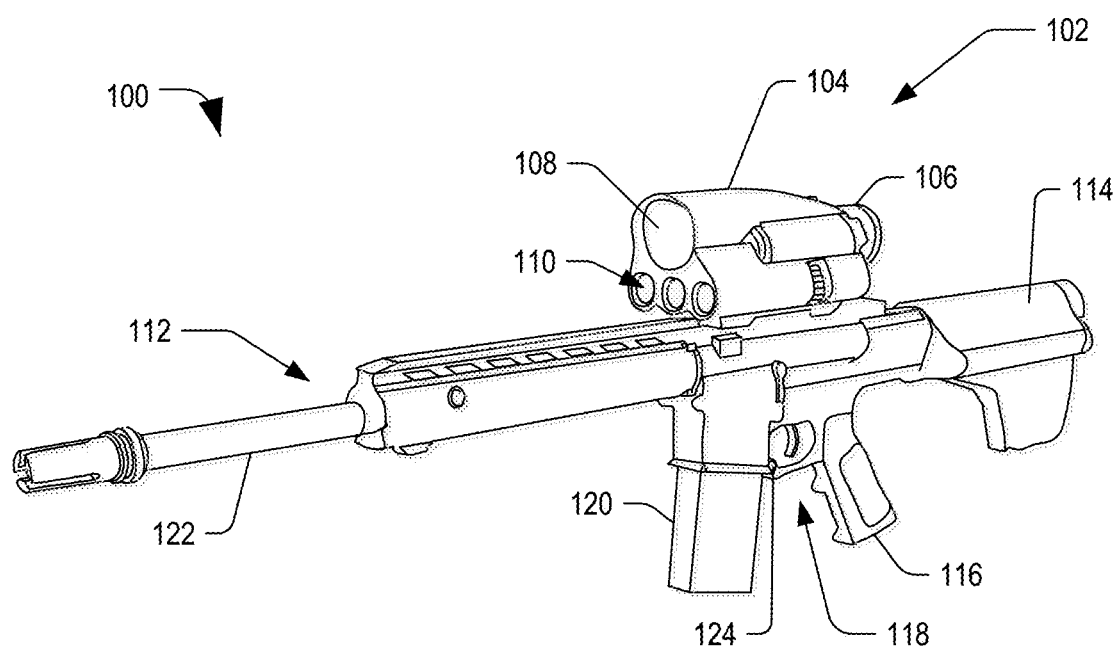
FIG. 1 depicts a perspective view of a firearm system including an optical scope configured to detect a target based on laser rangefinder data, in accordance with certain embodiments of the present disclosure.

FIG. 1 depicts a perspective view of a firearm system 100 including an optical scope 102 configured to detect a target based on laser rangefinder data, in accordance with certain embodiments of the present disclosure. The optical scope 102 may include a housing 104 configured to house circuitry including a laser rangefinder circuit including an emitter and one or more receivers or sensors. The circuitry may also include one or more orientation sensors, one or more environmental sensors (e.g., temperature, humidity, barometric pressure, wind, etc.), input interfaces, a trigger assembly interface, processor circuitry, and a display. The optical scope 102 may include a viewing lens 106 through which a user may view the display, which is internal to the housing 104. Further, the optical scope 102 may include an objective lens 108 for receiving light associated with a view area and for focusing light toward the one or more optical sensors. The optical scope 102 further includes lenses, generally indicated at 110, which may correspond to the emitter and one or more receivers (or optical sensors) of the laser rangefinder circuit.

The firearm system 100 may further include a firearm 112 having an upper surface to which the optical scope 102 is mounted. The firearm 112 may include a stock 114, a grip 116, a trigger assembly 118, a clip 120, and a muzzle 122. The trigger assembly 118 can include a trigger guard, a trigger shoe, and circuitry that may be electrically coupled to a trigger interface of the optical scope 102. In some embodiments, the trigger guard may include a user-selectable button or switch 124 that can be accessed by a user to interact with at least one feature of the optical scope 102.

In a particular example, the optical scope 102 may be configured to capture optical data corresponding to the view area. The processor of the optical scope 102 may process the image data and present the image data together with a reticle (and optionally other data, such as range data, environmental data, and the like) to the display within the optical scope 102. The user may view the image data, reticle, and other data through the viewing lens 106.

In some embodiments, the user may depress the button 124 to initiate a target selection operation. The user may then align the reticle to an object within the view area and may release the button to select the object as a target. In some embodiments, the processor of the optical scope 102 may determine the orientation of the optical scope 102 from the orientation sensors and may process the optical data corresponding to the orientation of the optical scope 102 when the button 124 is released to apply a visual marker on the selected target. The visual marker may be a square, an ellipse, a star, or another visual indicator, which may be applied to the selected object at a location corresponding to the aim point of the firearm system 100 when the button 124 was released. The processor of the optical scope 102 may subsequently process the optical data, substantially continuously, to track the selected target and to maintain the visual marker on the selected target as the aim point of the firearm system 100 changes and as the selected target moves within the view area.

In some embodiments, the laser rangefinder circuit may be configured to perform a range finding operation by emitting a plurality of pulses through one of the lenses 110 and receiving a plurality of reflections through another of the lenses 110. In certain embodiments, the laser range finding operation may be initiated by the user by pulling the trigger shoe of the trigger assembly 118. As the aim point of the firearm system 100 moves within the view area, the laser rangefinder circuit may emit a plurality of focused beam pulses in a direction of the aim point. The beam may diverge as the range increases. In a particular embodiment, the beam may diverge to a substantially circular or elliptical shape having a diameter of about 10 inches at a range of approximately 100 yards, and the divergence may increase at greater ranges. Accordingly, the reflections received by the laser rangefinder circuit through the lens 110 may include reflections corresponding to the object as well as ambient noise and reflections from other objects. At least one of a controller of the rangefinder circuit and a processor of the optical scope 102 may be configured to measure the intensity of reflections (correlated to the orientation of the firearm system 102 at the time the reflection was received) to determine edges or boundaries of a target based on a ratiometric scaling of the intensity of the samples of the reflections received over time.

In certain embodiments, once the edge or boundary of the target is determined, the processor of the optical scope 102 may be configured to automatically select the object as the target and to apply a visual marker to the selected target at a midpoint between the determined boundaries or edges. In an instance involving manual selection of a target, such as by depressing and releasing the button 124 as discussed above, the processor of the optical scope 102 may be configured to adjust or improve the placement of the visual marker based on the detected edges or boundaries of the selected target, such as by centering the visual marker on the selected target.

In a particular embodiment, the firearm system 100 may be an embodiment of a precision-guided firearm. In this example, the optical scope 102 may monitor the orientation of the firearm 112 to determine the aim point. Further, based on the range data, temperature data, wind data, barometric pressure, humidity, elevation, altitude, incline, other information, or any combination thereof, the processor may calculate a ballistic solution for the firearm system 100. The ballistic solution includes the estimated impact location for the ballistic if the firearm system 100 were discharged. In some embodiments, the optical scope 102 may control timing of the discharge of the firearm 114 to prevent discharge when the calculated ballistic solution indicates that the ballistic would not strike the target and to enable discharge when the ballistic solution indicates that the target will be hit. Thus, a user may depress the trigger shoe and the firearm system 100 will not discharge the ballistic until the aim point is aligned to the selected target.

In the above-discussion, the laser rangefinder circuit or the processor of the optical scope 102 may utilize ratiometric scaling of the measurements of the intensity of reflections to determine the boundaries or edges of an object. In one example, the measurements of intensity of reflections may represent a maximum intensity when the focused beam is aligned to the target and may represent a minimum (or lower) intensity when the focused beam is not aligned to the target. As the focused beam transitions from misalignment to alignment with the target, the measurements of the intensity of the reflections may increase rapidly, and the reflections correlated to the orientation data may be utilized to determine where the edges or boundaries of the target are located.

In a particular embodiment, the laser rangefinder may emit sixty-four laser pulses and receive a plurality of reflections approximately sixty times each second. The measurements of the intensity of reflections correlated to a particular orientation scale as the aim point of the firearm system 100 pans onto the target. The ratiometric scaling of the measurements of the intensity of the reflections can then be used to determine the target extent.

In some examples, the receivers or optical sensors of the laser rangefinder circuit may be focused to receive reflections from a portion of the divergence area of the focused beam. For example, the divergence area may represent an elliptical shape or a substantially circular shape at a particular range. The laser rangefinder circuit may include three optical receivers or optical sensors, each of which may be configured to receive reflections from a different portion of the divergence area, where the different portions within the divergence area. In some embodiments, the different portions of the divergence area may be substantially aligned, horizontally. In some embodiments, as the firearm system 100 pans across a view area, the three optical receivers or optical sensors may receive different reflection measurement intensities, which can be used to determine the target extent based on measurements of the light intensities captured by each of the receivers or optical sensors or based on a comparison of ratios of such measurements. Other embodiments are also possible.

Figure 2:
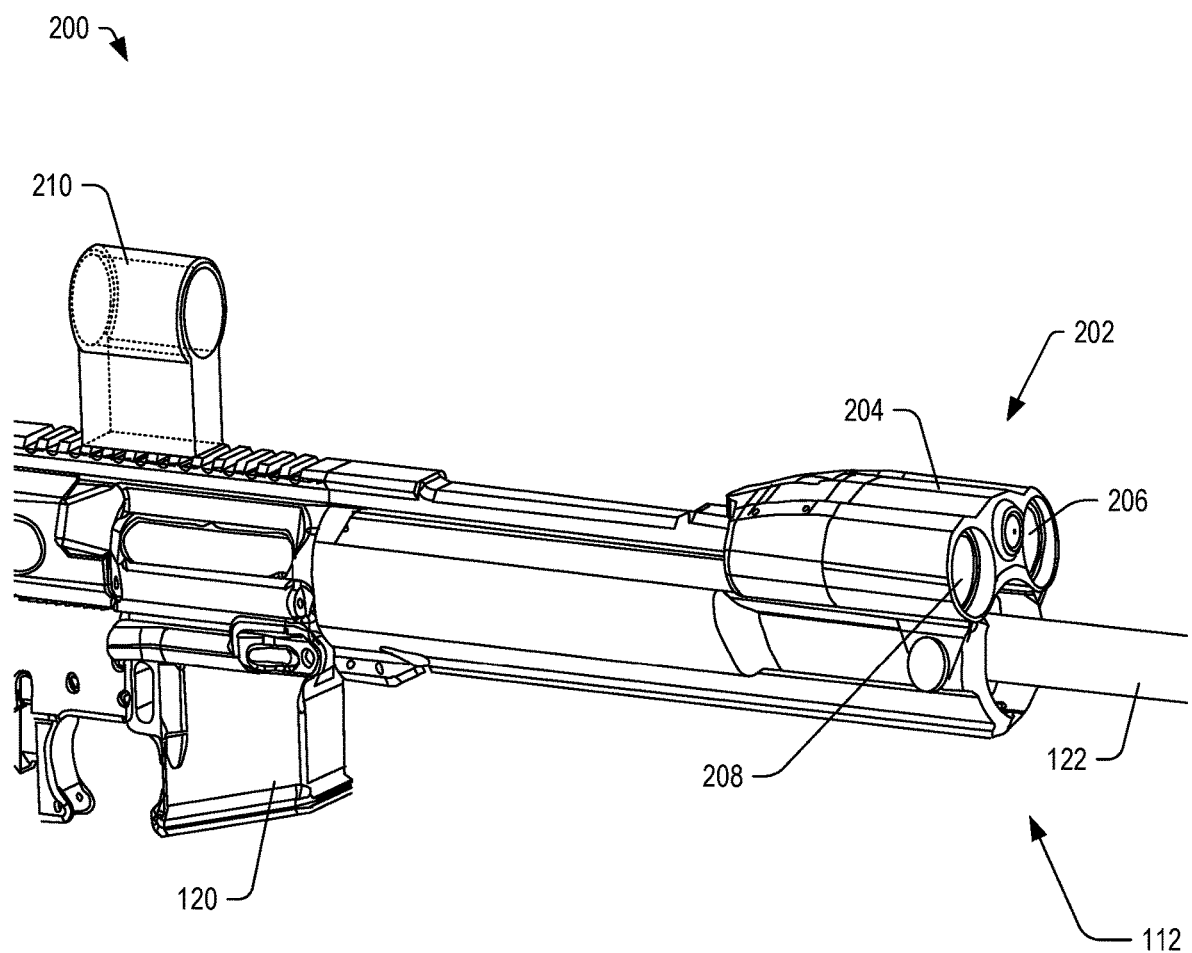
FIG. 2 depicts a perspective view of a firearm system including a rangefinder device configured to detect a target based on laser rangefinder data, in accordance with certain embodiments of the present disclosure.

FIG. 2 depicts a perspective view of a firearm system 200 including a rangefinder device 202 configured to detect a target based on laser rangefinder data, in accordance with certain embodiments of the present disclosure. In this example, the firearm system 200 may be an embodiment of the firearm system 100 of FIG. 1, with the optical device 102 omitted. In this example, the rangefinder device 202 may be communicatively coupled to the trigger assembly 118, and the timing of discharge of the firearm 112 may be controlled by a control circuit or processor of the laser rangefinder device 202 to prevent discharge of the firearm 112 until the aim point of the firearm 112 is aligned to a location within the extent (boundaries or edges) of the selected target. In the illustrated example, the firearm 112 may include a mount 210 configured to engage and secure a telescopic sight to the firearm 112.

The rangefinder device 202 may include a housing 204 defining an enclosure configured to secure a laser rangefinder circuit including an emitter configured to emit a focused beam through a lens 206 toward a view area. The laser rangefinder circuit may further include one or more optical receivers or optical sensors configured to receive light, including ambient light and a plurality of reflections, from the view area through a lens 208. The one or more optical receivers or optical sensors may be configured to generate an electrical signal proportional to the received light. The laser rangefinder circuit may further include orientation sensors configured to determine an orientation of the firearm 112. Further, the laser rangefinder circuit may include a processor configured to correlate the plurality of reflections to the orientation data and to determine the intensity of reflections at each orientation. The processor may be configured to determine a target extent based on the determined intensity of the reflections. In some embodiments, the processor may be configured to automatically select a target based on the determination of the edges or boundaries of the target, and may control timing of the discharge of the firearm 112 by sending control signals to the trigger assembly 118 to selectively enable discharge when the aim point of the firearm 112 is aligned to the selected target.

Figure 3:
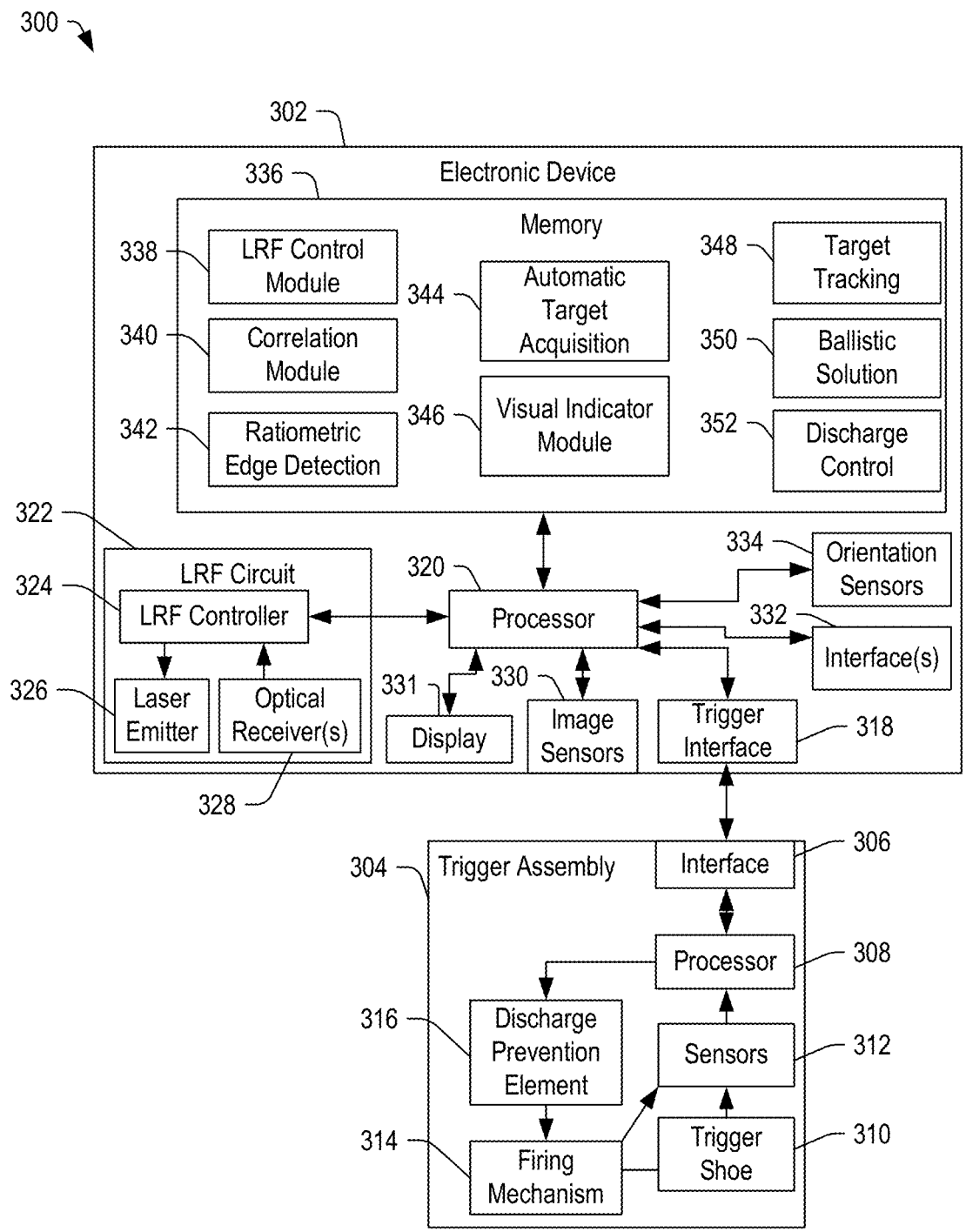
FIG. 3 depicts a block diagram of a system including an electronic device configured to detect a target based on laser rangefinder data, in accordance with certain embodiments of the present disclosure.

FIG. 3 depicts a block diagram of a system 300 including an electronic device 302 configured to detect a target based on laser rangefinder data, in accordance with certain embodiments of the present disclosure. The electronic device 302 may be an embodiment of the optical scope 102 of FIG. 1 or the laser rangefinder device 202 of FIG. 2. The system 300 may further include a firearm 112 including a trigger assembly 304 coupled to the electronic device 302.

The trigger assembly 304 may include an interface 306 configured to couple to the electronic device 302. Further, the trigger assembly 304 may include a controller 308 coupled to the interface 306. The trigger assembly 304 may further include a trigger shoe 310 that may be pulled by a user, and may include one or more sensors 312 that can determine a state of the trigger shoe 312 and associated components of a firing mechanism 314. The trigger assembly 304 may further include a discharge prevention element 316 coupled to the processor 308 and configured to prevent discharge of the firing mechanism 314. In some embodiments, the discharge prevention element 316 may be controlled by the processor 308 in response to signals from the electronic device 302.

The electronic device 302 may include a trigger interface 318 configured to couple to the interface 306 of the trigger assembly 304. The electronic device 302 may further include a processor 320 coupled to the trigger interface 318. The processor 320 may also be coupled to a laser rangefinder (LRF) circuit 322, which may include an LRF controller (or processor) 324. The LRF controller 324 may be coupled to a laser emitter 326 to control the laser emitter 326 to emit a focused beam toward a view area. The LRF controller 324 may also be coupled to one or more optical receiver 328 configured to receive light from the view area, including ambient light and reflected light. The processor 320 may be coupled to a display 331, which may be viewed by a user through the viewing lens 106 (in FIG. 1). The processor 320 may be coupled to one or more interfaces 332, such as an interface coupled to a button, switch, or other input element. The processor 320 may also be coupled to one or more orientation sensors 334, such as a gyroscope, an inclinometer, or other sensors configured to determine the orientation of the electronic device 302. The processor 320 may also be coupled to one or more optical sensors or image sensors 330 configured to capture optical data associated with the view area. The processor 320 can also be coupled to a memory 336, which may be a non-volatile memory.

The memory 336 may store data and optionally instructions that, when executed, may cause the processor 320 to determine edges or boundaries of a target. The memory 336 may include an LRF control module 338 that, when executed, may cause the processor 320 to control the LRF circuit 322 to emit a plurality of pulses of a focused beam toward the view area and to receive reflected light at one or more optical sensors. The LRF controller 324 may provide data corresponding to the received reflections to the processor 320.

The memory 336 may include a correlation module 340 that, when executed, may cause the processor 320 to correlate data determined from received reflections to orientation data from the orientation sensors 334 and time data. The memory 336 can also include a ratiometric edge detection module 342 that, when executed, may cause the processor 320 to detect edges of objects within the view area based on changing intensities of reflections over time. In some embodiments, the ratiometric edge detection module 324 may cause the processor 320 to compare intensity of reflections at different orientations in order to detect edges (or boundaries) to determine the extent of a target based on changes in the measured intensity of reflections over time or based on a comparison the measured intensity of reflections at different orientations.

The memory 336 may include an automatic target acquisition module 344 that, when executed may cause the processor 320 to automatically select a target based on the range data and the determination of the edges of the target from changes in the measured intensity of reflections. The memory 336 may include a visual indicator module 346 that, when executed, may cause the processor 320 to generate a reticle that can be overlaid onto the image data provided to the display 331. In a particular example, the visual marker may be applied to a selected location on the selected target. The automatic target acquisition module 344 may cause the visual indicator module 346 to apply the visual marker to the selected target at a midpoint between the detected edges of the target object, determined from the laser rangefinder data.

The memory 336 can also include a tracking module 348 that, when executed, may cause the processor 320 to track the target within the optical data corresponding to the view area and to maintain the visual marker on the selected target as the image data changes and as the target moves. The memory 336 can also include a ballistic solution module 350 that, when executed, may cause the processor 320 to calculate a ballistic impact location based on the current aim point of the firearm 112 and based on environmental data, range data, and other information. The memory 336 can also include a discharge control module 352 that, when executed, may cause the processor 320 to control timing of the discharge of the firing mechanism 314 of the trigger assembly 304 based on the ballistic solution to enable discharge when the ballistic solution indicates that the aim point of the firearm is aligned to the selected target. The discharge control module 352 may cause the processor 320 to provide control signals to the discharge prevention element 316 of the trigger assembly 304 to control the timing of discharge. Other embodiments are also possible.

In some embodiments, the laser rangefinder circuit 322 may capture a plurality of reflections corresponding to a view area as the electronic device 302 pans the view area. The laser rangefinder circuit 322 may determine the intensities of reflections over time and sort the reflections into different buckets or categories corresponding to the orientation. The laser rangefinder circuit 322 or the processor 320 may utilize the correlated reflections to determine the edges or boundaries of an object within the view area, which may be selected automatically (or manually by the user) as a selected target.

Figure 4A:
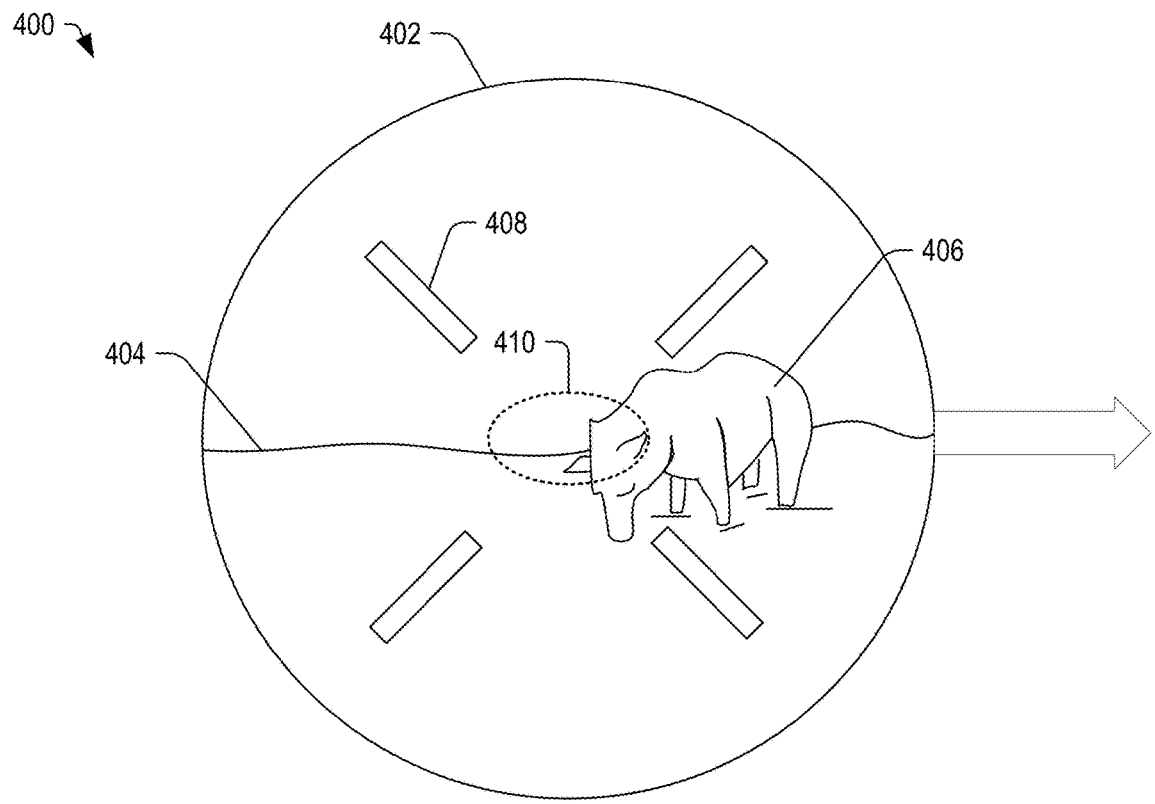
FIG. 4A depicts a view area of the optical scope of FIG. 1 and including an ellipse representing divergence of a focused beam of a laser rangefinder, in accordance with certain embodiments of the present disclosure.

FIG. 4A depicts a view area 400 of the optical scope 102 of FIG. 1 and including an ellipse 410 representing divergence of a focused beam of a laser rangefinder, in accordance with certain embodiments of the present disclosure. The view area 400 is depicted as a circular display 402, which may correspond to the circular viewing aperture provided by the viewing lens 106. The display 402 may present optical data from the view area, such as the horizon 404 and an object 406, such as a potential target. The display 402 may also present a reticle 408, which may be generated by the processor 320 in FIG. 3.

In the illustrated example, the ellipse 410 partially overlaps the potential target, producing a plurality of reflections having an intensity that is less than if the ellipse 410 completely overlapped the object 406. An example of the sample intensity is depicted in FIG. 4B.

Figure 4B:
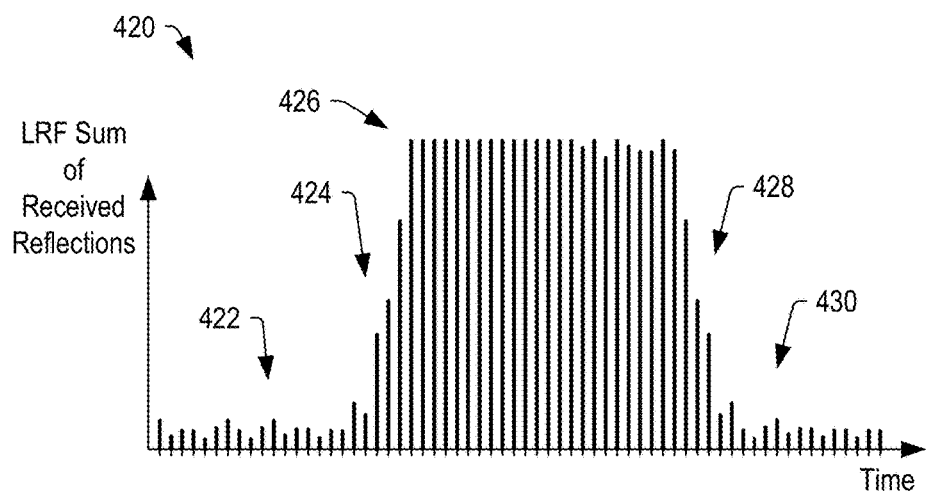
FIG. 4B depicts a graph of signal amplitude of laser rangefinder samples over time for the optical scope of FIG. 4A, in accordance with certain embodiments of the present disclosure.

FIG. 4B depicts a graph 420 of signal amplitude of laser rangefinder samples over time for the optical scope of FIG. 4A, in accordance with certain embodiments of the present disclosure. The signal amplitude may be based on a sum of counted reflections, which are determined from the intensity of reflected light. In this example, at 422, light may be received by the laser rangefinder circuit that produces noise. At 424, a portion of the laser rangefinder beam may be overlapping an edge of the object 406. At 426, the laser rangefinder beam may completely overlap the object 406. At 428, the laser rangefinder beam may begin to move off of the object 406, and the intensity of the light received from the reflections may decrease. At 430, the laser rangefinder beam may receive ambient light, which may register as noise. In certain embodiments, the number of reflection counts may track the signal strength (amplitude).

It should be appreciated that the illustrated example of FIG. 4B is representative only, and is provided for illustrative purposes. In actual implementations, the intensity of samples may vary more as the device pans across the view area. Moreover, the intensity reflected by the samples generally indicated at 424 and 428 may vary more gradually and the complete coverage indicated at 426 may be narrower and less uniform. Other embodiments are also possible.

In some embodiments, it may be desirable to employ a sensor array, where the sensors may be focused on a portion of the laser rangefinder beam, such that each sensor is directed to a different portion of the area illuminated by the beam. By capturing reflections from different portions of beam-illuminated area, the reflections may provide more granular range data that can be used to determine the boundaries or edges of objects within the view area. In certain embodiments, the optical sensors may be implemented as an array of optical sensors, where portions of the array may be focused to capture reflects from different portions of the area illuminated by the beam. One possible example that utilizes three optical sensors or receivers configured to capture data from three different portions of the laser illuminated area is described below with respect to FIGS. 5A and 5B.

FIG. 5A depicts an illustrative example of a portion of a view area 500 corresponding to an area 501 illuminated by a divergent beam of a laser rangefinder and including circular areas 506, 508, and 510 corresponding to an array of focused optical receivers configured to receive reflected light, in accordance with certain embodiments of the present disclosure. In the illustrated example, the laser rangefinder circuit may include an array of optical sensors or receivers, which may be focused on different portions of the area illuminated by the focused beam. In an example, the first area 506 may correspond to a first sensor (or first sensor array), the second area 508 may correspond to a second sensor (or second sensor array), and the third area 510 may correspond to a third sensor (or third sensor array).

FIG. 5B depicts a graph 520 of laser rangefinder samples over time for each optical receiver of the array of FIG. 5A. In this example, the intensity of samples captured from the area 506 may be represented by the graph 526. The samples captured from the area 508 are represented by the graph 528. The samples captured from the area 510 are represented by the graph 530.

In the illustrated example, the area 501 includes a horizon 502 and an object 504. The third sensor and the associated third area 510 have already passed over the object 504, producing a plurality of samples corresponding to the width of the object 504 as the device is panned from left to right across the view area. The second sensor and the associated second area 508 have not yet overlapped the object 504, and the associated samples represented in the graph 528 indicate noise. Similarly the first sensor and the associated first area 506 have not overlapped the object 504, and the samples represented in the graph 526 indicate noise.

As the device is panned further toward the right and the second sensor and the associated second area 508 move onto the object 504, the samples of the graph 528 will indicate reflections corresponding to the object. By comparing the orientation data and the sample data from the second sensor to that of the first sensor, the processor (whether internal to the laser rangefinder circuit or part of the device) can determine the edge or boundary of the object.

In some embodiments, the extent of the target object may be used to automatically determine a target within the view area. Once determined, the electronic device may select the target and may automatically apply a visual indicator to the target at a location that is centered between the edges of the target. In an example where a user may manually select a target, the location of the visual marker on the target may be adjusted based on the determination of the edges or boundaries of the object. As discussed above, in some embodiments, timing of discharge of a firearm may be controlled to prevent discharge when an aim point of the firearm is not aligned to the target and to enable discharge when the aim point is aligned to the target. The determination of the alignment of the aim point may be made based on orientation data from the sensors, optical data from one or more optical sensors, range data from a current aim point, or any combination thereof.

Figure 6:
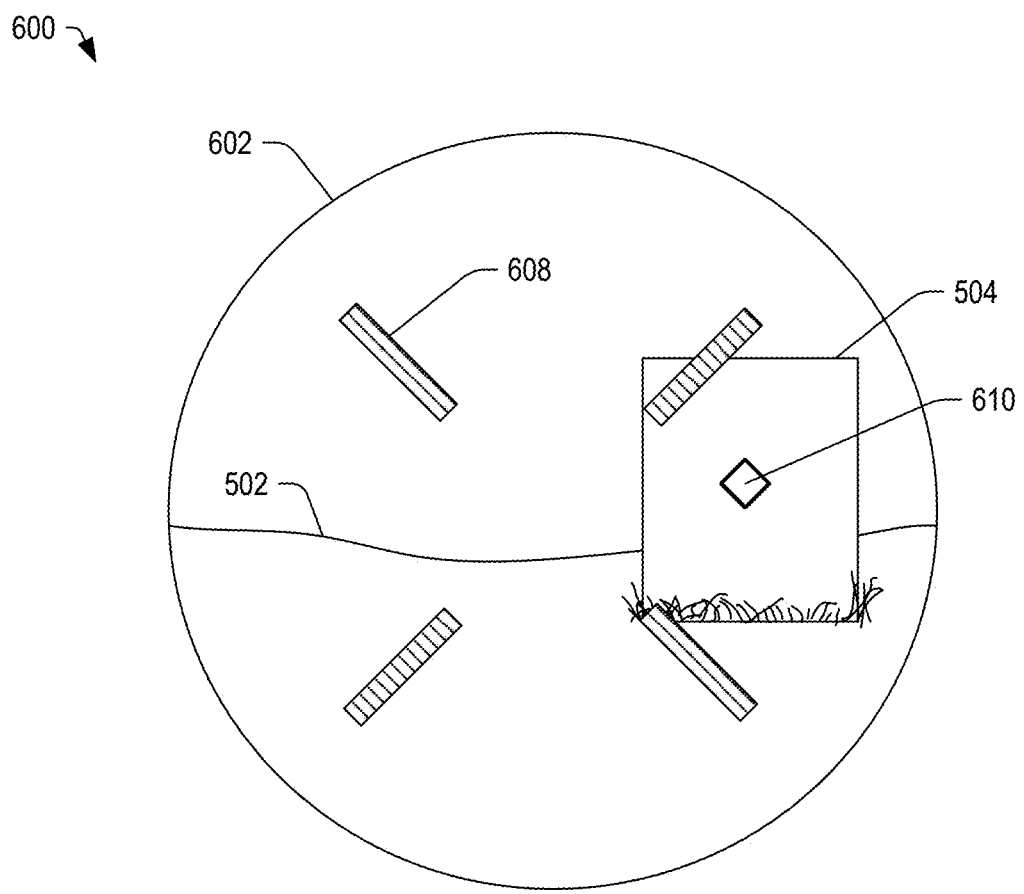
FIG. 6 depicts a view area of the optical scope of FIG. 1 including a selected target selected automatically based on the laser rangefinder samples, in accordance with certain embodiments of the present disclosure.

FIG. 6 depicts a view area 600 of the optical scope 102 of FIG. 1 including a selected target selected automatically based on the laser rangefinder samples, in accordance with certain embodiments of the present disclosure. In this example, the target 504 and the horizon 502 are shown from FIG. 5A. After ranging the target using at least two of the sensors, the intensities of reflections were used to determine the edges or boundaries of the object 504, which edges or boundaries can be used to determine a target extent and optionally to automatically select the target based on the determined target extents. A processor may apply a visual marker 610 (in this instance, a diamond shape) to the object 504 within display data provided by the processor to a display, where the display data corresponds to a portion of set of optical data corresponding to the view area. The image data captured from the view area by one or more optical sensors may be provided to a display within the optical scope 102 together with a reticle 608 and the visual marker 610.

As the user directs or aims the optical scope 102, the optical data within the view area 602 may change. Further, in some embodiments, the selected target may move within the view area 602. The processor may cause the visual marker 610 to remain at the same position on the selected target object 504 frame after frame, tracking the target object 504 within the view area 602. Other embodiments are also possible.

Figure 7:
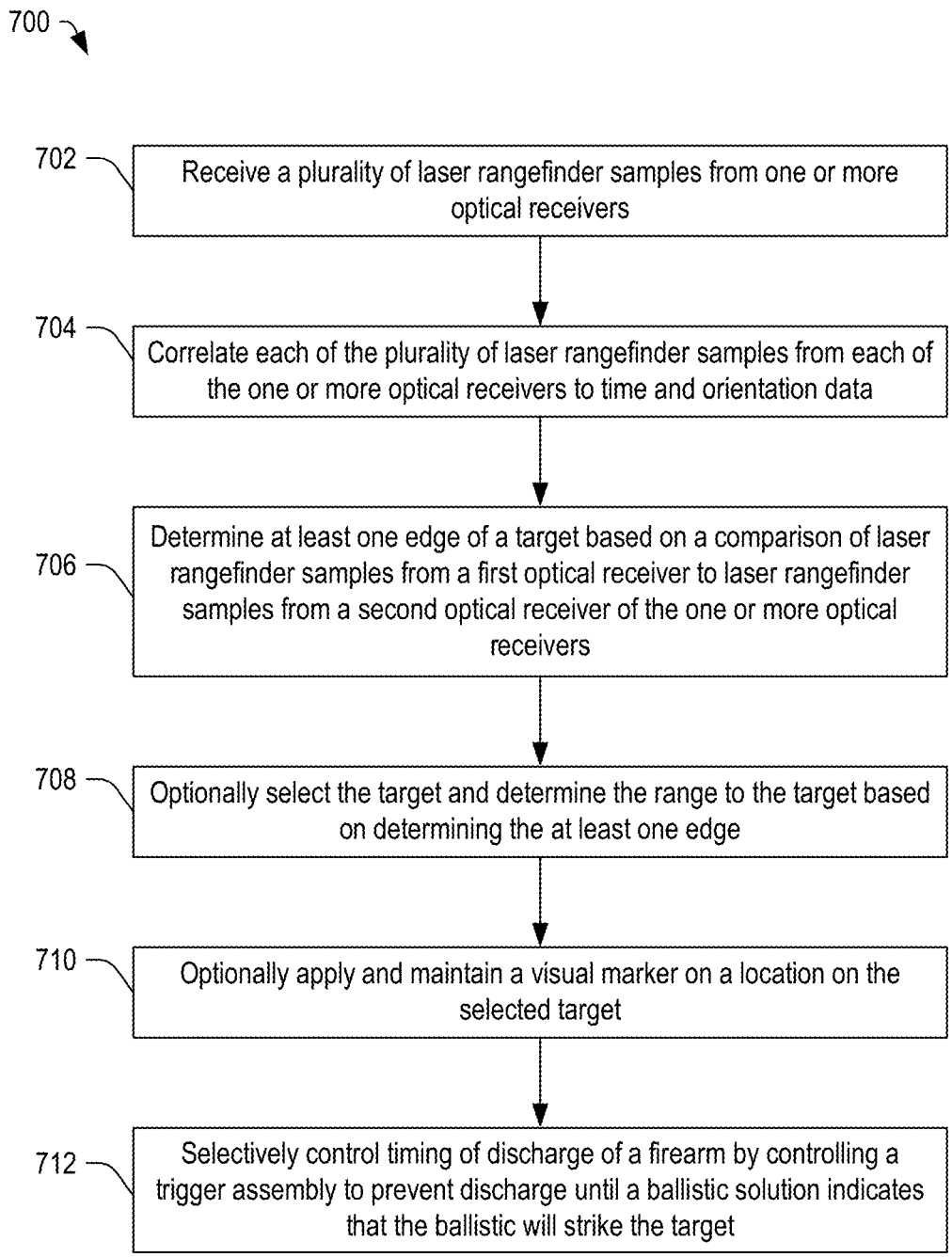
FIG. 7 depicts a method of detecting a target based on laser rangefinder data, in accordance with certain embodiments of the present disclosure.

FIG. 7 depicts a method 700 of detecting a target based on laser rangefinder data, in accordance with certain embodiments of the present disclosure. At 702, the method 700 may include receiving a plurality of laser rangefinder samples from one or more optical receivers. In some embodiments, the one or more optical receivers may include a single optical sensor configured to receive reflected light corresponding to a frequency of the focused beam. In some embodiments, the one or more optical receivers may include an array of optical sensors configured to receive reflected light corresponding to a frequency of the focused beam reflected from different portions of the divergent beam. Other embodiments are also possible.

At 704, the method 700 can include correlating each of the plurality of laser rangefinder samples from each of the one or more optical receivers to time and orientation data. In an example, the laser rangefinder may be configured to pulse the focused beam to provide a plurality of pulses, and may receive a plurality of reflections. Each of the pulses and the reflections may be correlated to orientation data.

At 706, the method 700 can include determining at least one edge of a target based on a comparison of laser rangefinder samples from a first optical receiver to laser rangefinder samples from a second optical receiver of the one or more optical receivers. As discussed above, the intensities of reflections at different orientations and from different sensors may be compared to determine the edges of the target object. In some embodiments, the intensities of reflections may be represented by the amplitudes of electrical signal produced by the optical sensors in response to receiving reflections.

At 708, the method 700 may include optionally selecting the target and determining the range to the target based on determining the at least one edge. In some embodiments, the device may automatically select the target based on edge detection.

At 710, the method 700 can include optionally applying and maintaining a visual marker on a location on the selected target. The device may maintain the visual marker on the selected target frame after frame as the target moves within the view area, as the user adjusts the orientation of the device so that the image data within the view area changes, or both. In an example, a processor may apply the visual marker as a digital overlay within display data provided to a display of the device, such that the visual marker remains on the selected target, frame after frame.

At 712, the method 700 can include selectively controlling timing of discharge of a firearm by controlling a trigger assembly to prevent discharge until a ballistic solution indicates that the ballistic will strike the target (or the location of the visual tag on the target). In some embodiments, the processor of the electronic device may calculate a ballistic solution and monitor the aim point of the firearm based on the orientation data. The processor may determine the orientation of the firearm based on orientation sensor data and may selectively enable the trigger mechanism to discharge when the ballistic solution is predicted to intersect the visual tag on the target based on the orientation of the firearm. Other embodiments are also possible.

In conjunction with the systems, devices, and methods described above with respect to FIGS. 1-7, a device may include a laser rangefinder circuit configured to capture reflections corresponding to a view area. In some embodiments, the device may be configured to determine when the focused beam is at least half on target based on measured intensities of reflections. In other embodiments, the device may be configured to detect an edge of a target based on counts of reflections over time, based on the aggregate amplitudes of reflections at particular orientations, and so on. In certain embodiments, the device may use ratiometric scaling of the measured reflections over time to detect the edge of a target. In some embodiments, by utilizing an array of optical sensors focused on different portions of an area circumscribed by divergence of the focused beam. The reflections from each of the sensors may be correlated in time and to orientation data and the measurements of reflections may be used to detect the edge of a target.

In some embodiments, in addition to edge detection, the device may automatically select a target based on the detected edges. Further, in some embodiments, the device may apply a visual marker to the selected target. The visual marker may be applied within image data presented to a display, together with a reticle. The visual marker may be a square, triangle, diamond, circle, star, or other shape, and the device may update the position of the visual marker to track the position of the selected target within the view area. Further, in some embodiments, the device may control timing of discharge of a firearm to selectively enable discharge when the firearm is aligned such that the ballistic solution indicates that discharging at that moment would ensure that the projectile would strike the target.

Although the present invention has been described with reference to preferred embodiments, workers skilled in the art will recognize that changes may be made in form and detail without departing from the scope of the invention.

What is claimed is:

1. A device comprising:
    a laser rangefinder circuit including an emitter configured to direct a focused beam toward a view area and including at least one optical sensor configured to receive reflections associated with objects within the view area, the at least one optical sensor comprises:
        a first sensor configured to capture reflections associated with a first portion of an area circumscribed by a focused beam within the view area; and
        at least one second sensor configured to capture reflections associated with a different portion of the area;
    at least one orientation sensor configured to determine orientation data corresponding to an orientation of the laser rangefinder circuit; and
    a processor coupled to the laser rangefinder circuit and the at least one orientation sensor and configured to correlate the reflections to the orientation data, the processor configured to determine an edge of an object within the view area based on changes in intensity of measurements of the reflections at particular orientations of the laser rangefinder circuit.

2. The device of claim 1, wherein the processor is configured to:
    determine a first measurement of the reflections received by the at least one optical sensor when the laser rangefinder circuit is aligned to the object; and
    determine a second measurement of the reflections when the laser rangefinder circuit is not aligned to the object;
    wherein the first measurement is greater than the second measurement.

3. The device of claim 2, wherein the processor determines the edge of the object when a measurement of the reflections is between a first amplitude associated with the first measurement and a second amplitude associated with the second measurement.

4. The device of claim 1, wherein the processor determines the edge of the object based on a ratiometric scaling of a count of the reflections determined from the measurements over time.

5. The device of claim 1, wherein the processor is configured to automatically select the object as a target in response to determining the edge of the object.

6. The device of claim 5, further comprising:
    a firearm including a trigger assembly coupled to the processor; and
    wherein the processor is configured to determine a ballistic solution for the selected target, to determine an orientation of the firearm based on the orientation data, and to selectively control timing of discharge of the firearm to enable discharge when the processor determines that an aim point of the firearm is aligned to the selected target.

7. The device of claim 1, wherein the laser rangefinder circuit includes the processor.

8. A method comprising:
    directing a focused beam from an emitter of a laser rangefinder circuit toward a view area of a device;
    receiving first light associated with a first portion of the view area that is circumscribed by the focused beam at one or more first sensors of the laser rangefinder circuit, the light including ambient light and reflected light;
    receiving second light associated with a second portion of the view area at one or more second sensors; and
    determining an edge of an object within the view area based on measurements of reflections received by the one or more first sensors and the one or more second sensors using a processor circuit.

9. The method of claim 8, further comprising automatically selecting, by the processor circuit, the object as a target for a firearm.

10. The method of claim 9, further comprising:
    providing image data from an optical sensor to a display using the processor circuit;
    applying, by the processor circuit, a visual marker to the target within optical data provided to the display; and
    maintaining the visual marker on the target over time.

11. The method of claim 9, further comprising:
    determining, by the processor circuit, an aim point of a firearm based on orientation data;
    controlling a trigger assembly of the firearm via control signals from the processor circuit to selectively enable discharge of the firearm when the aim point is aligned to the selected target and to prevent discharge when the aim point is not aligned to the selected target.

12. The method of claim 8, wherein determining the edge of the object comprises:
    determining, using the processor circuit, a first count of the reflections from the object based on the measurements;
    determining, using the processor circuit, a second count of the reflections not associated with the object based on the measurements; and
    wherein the first count is greater than the second count.

13. The method of claim 12, further comprising determining the edge based on a third count determined from the measurements when the reflections include reflections from the object and reflections not associated with the object.

14. A device comprising:
    a laser rangefinder circuit including an emitter configured to direct a focused beam toward a view area and including one or more optical sensors configured to receive light including ambient light and reflections associated with the view area, the one or more optical sensors comprising a first sensor and a second sensor, the first sensor to capture reflections associated with a first portion of an area circumscribed by a focused beam within the view area, the second sensor to capture reflections associated with a different portion of the area; and
    a processor coupled to the laser rangefinder and configured to determine an edge of an object within the view area based on measurements of the reflections from the one or more optical sensors of the laser rangefinder circuit.

15. The device of claim 14, further comprising:

at least one orientation sensor coupled to the processor and configured to determine orientation data corresponding to an orientation of the laser rangefinder circuit;

wherein the processor is configured to correlate the measurements of the reflections to the orientation data and to determine the edge of the object based on the correlated measurements.

16. The device of claim 14, further comprising a firearm coupled to the laser rangefinder circuit, the firearm including a trigger assembly coupled to the processor and responsive to control signals from the processor.

17. The device of claim 14, wherein the one or more optical sensors includes:

a first optical sensor configured to receive first reflections from a first portion of an area within the view area that is circumscribed by the focused beam; and at least one second optical sensor configured to receive second reflections from at least one second portion of the area.

18. The device of claim 17, wherein the processor is configured to determine the edge based on a first count of first reflections and a second count of second reflections determined from the measurements.

19. The device of claim 14, wherein the processor is configured to:

determine a first count of the reflections from the object based on the measurements;

determine a second count of the reflections not associated with the object based on the measurements; and determine an edge of the object based on an orientation of the laser range finder circuit when a count of the reflections transitions from the first count toward the second count or from the second count toward the first count.

* * * * *